Patented July 14, 1931

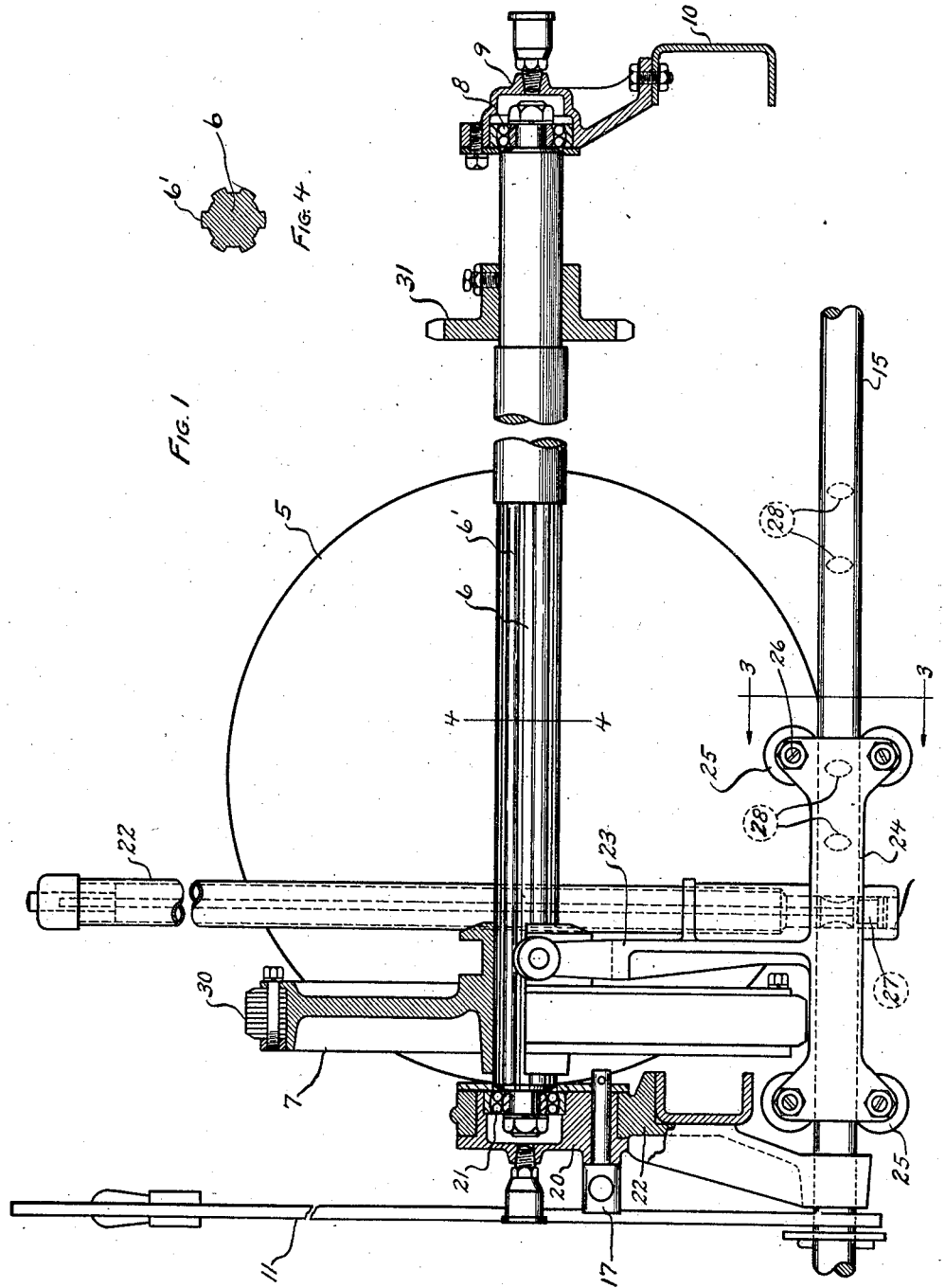

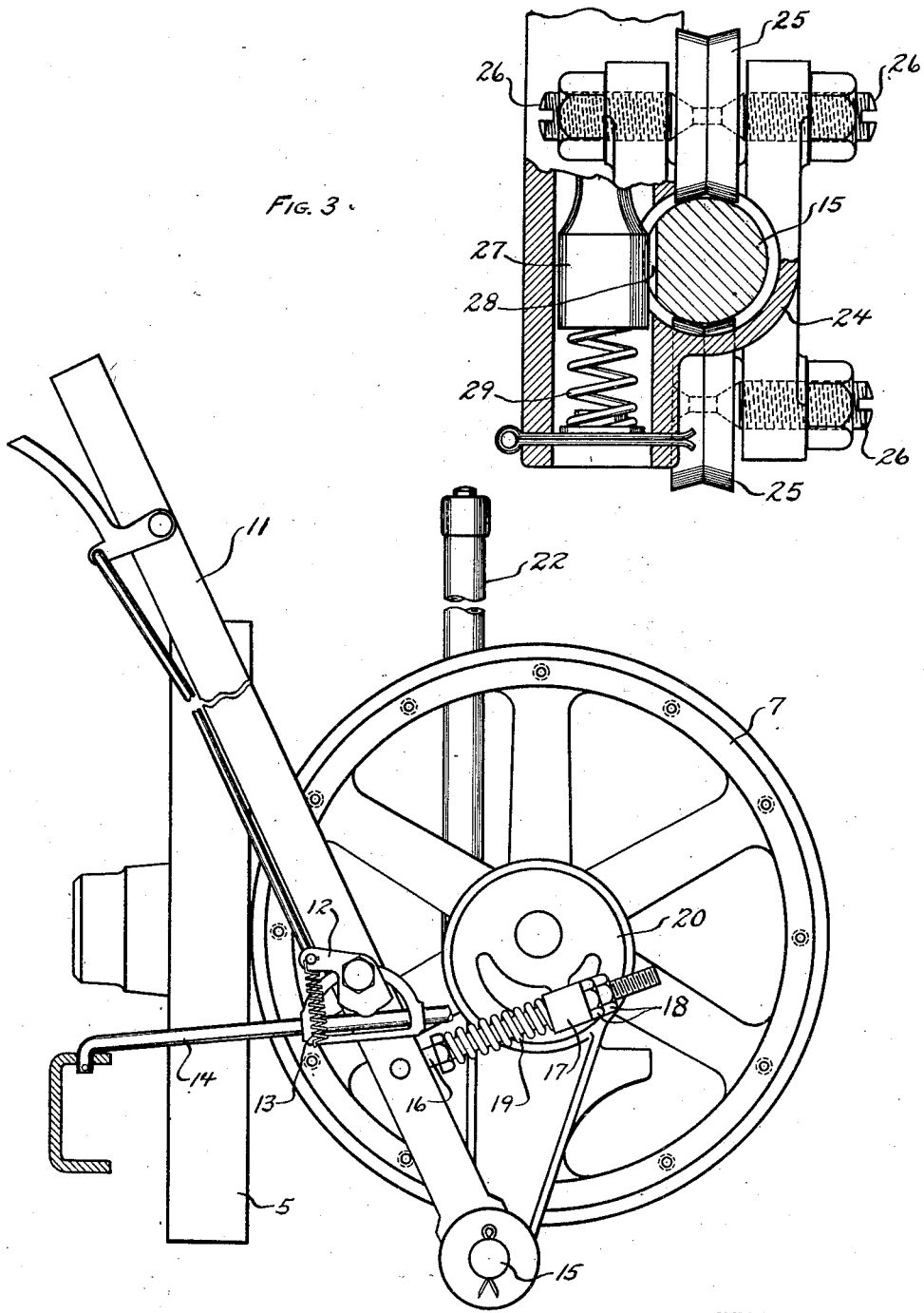

1,814,381

UNITED STATES PATENT OFFICE

CHARLES GROSS, OF THREE RIVERS, MICHIGAN, ASSIGNOR TO FAIRBANKS, MORSE & CO., OF CHICAGO, ILLINOIS, A CORPORATION OF ILLINOIS

FRICTION TRANSMISSION

Application filed September 22, 1927. Serial No. 221,348.

This invention relates to improvements in friction transmission, and more particularly to those of the type employing a wheel and a disc in angular frictional engagement.

An object of this invention is to provide a novel and simple means of applying the pressure requisite for producing friction between the driving and driven members of a transmission of the class designated.

A further object is to provide a new and simple means of mounting a friction wheel shaft, in order to provide for ease and simplicity of regulation of the friction pressure.

Further objects and advantages of the invention will appear from the drawings and the following detailed description.

The drawings and descriptive matter illustrate an embodiment of the invention as adapted for use on a railway motor car, in which a friction disc and an engaging friction wheel serve not only as a means of regulating the vehicle speed, and forward and reverse directions of travel, but also perform the usual functions of a clutch assembly. It will be understood that in practice, the device may be varied substantially from the illustrated structure, that the device may be adapted with or without modifications to other uses and purposes; that the foregoing and other changes may be made without departure from the spirit, scope, and full intendment of the invention, the described and illustrated example constituting merely a single executional embodiment of the invention, which is submitted in response to the statutory requirements relating to applications for Letters Patent.

In the drawings, Fig. 1 is a side elevation, partly in section, of a preferred embodiment of the invention. Fig. 2 is an end view of the assembly as seen from the control end thereof. Fig. 3 is a section taken along line 3—3 in Fig. 1. Fig. 4 is a section through the countershaft, along line 4—4 in Fig. 1.

Referring by numerals to the drawings, 5 designates a driving, friction disc. This disc is of conventional construction, for this type of transmission, and is provided on one side with an unobstructed plane surface, preferably of metal. Located substantially parallel to the plane of rotation of disc 5 is a countershaft 6, preferably provided with splines 6', which serve to engage a friction wheel 7. This construction permits the friction wheel to be moved, axially, along the shaft 6. The shaft 6 is journaled at one end in a double row, self-aligning ball bearing 8, which is mounted in a bearing-arm or housing 9, and the bearing arm carried by a frame member 10. The ball bearing assembly is capable of being rotated within limits, about an axis at right angles to the axis of rotation of the shaft 6.

The pressure of contact between the disc 5 and wheel 7, is controllable by a lever 11. A cam 12 on the lever, is depressed by a spring 13, against a stationary rod 14 to maintain the lever in the different positions to which it is adjusted. The lever 11 is pivoted, preferably at its lower end, on a shaft 15 which may serve to carry the shifting mechanism, hereinafter described, and may also serve as a brake shaft when the described apparatus is employed on a vehicle. A link 16 is pivotally connected at one end with the lever, the opposite end of the link being connected with a pin 17. The effective length of the link is adjustable through nuts 18, which also serve to adjust the pressure of a spring 19 carried on the link. The pin 17 engages a bearing arm or housing 20, which is preferably eccentrically disposed on the end of shaft 6, and may contain a bearing 21 therefor, similar to or identical with the bearing 8 on the opposite end of the shaft. The bearing arm is preferably rotatably carried by a frame member 22.

It will be seen from the drawings that by moving lever 11 to the right (Fig. 2), the link 16 will be moved against the pressure of spring 19 to rotate the eccentric bearing arm 20, but that upon moving the lever 11 to the left, the link has a positive operative connection, through pin 17, with the arm 20.

It will thus be seen that by actuating the lever 11, a forward or reverse motion, with reference to the plane of the disc 5, will be given to the left hand end (in Fig. 1) of the shaft 6. Movement of this end of the shaft 6, toward the disc 5 will cause contact between the outer edge of the wheel 7 and the disc 5, thereby causing the shaft 6 to rotate at a speed selectively controlled with respect to that of the disc 5.

In moving the left hand end of shaft 6, friction wheel 7 and the disc 5 become slightly angularly offset in the speed positions, forward and reverse, other than the high speed forward, and do not meet at exactly a right angle. This is due to the fact that this end of shaft 6 is longitudinally retained by the bearing arm and frame member, which are preferably not movable lengthwise by the mechanism used for bringing friction wheel 7 in contact with rotating disc 5. The small lengthwise movement of shaft 6 necessary to its slight radial movement, is preferably allowed between the bearing 8 and the bearing housing 9. Such a sliding or floating of the bearing assembly is entirely practical, since the extent of axial movement is practically negligible. Member 9 is slidable when the holding bolts are loosened, so that the shaft 6 can be adjusted to a parallel position with disc 5 when the friction wheel 7 is in contact with disc 5 in the high speed, forward, position, which position is used the greater part of the time. When shaft 6 is thus adjusted and fixed, the remaining speed positions of the friction wheel 7, are in the slightly angularly offset position before mentioned. This irregular angular contact between the friction surfaces does not affect the efficiency of the transmission, nor is any frictional area lost thereby, because the face of the wheel 7 tends to wear itself into a full contact with the disc 5.

Provision is made for the various forward and reverse speed positions of the wheel 7 by sliding the wheel along the shaft 6 by means of a hand lever 22 and a shifter yoke 23. The shifter yoke comprises a carriage 24, provided with rollers 25, one on the top and one on the bottom of the carriage, at each end thereof. The rollers are preferably grooved, to assist them to follow the shaft 15, on which the carriage is slidably mounted. The use of a carriage of substantial length, and the roller construction is of value to prevent any tendency of the carriage to bind on the shaft 15. The rollers serve to carry the load set up in shifting in each direction, and make it impossible to cramp the carriage and yoke assembly on the shaft.

The rollers 25 are pivoted on adjustable centers or pivots 26, preferably using one on each side of each roller and disposed as shown in Fig. 3. The adjustable pivots for the rollers serve to permit adjustment for wear and to insure the free rotation of the rollers. They also serve to fix the position of the shifter yoke on the shaft so that the locking mechanism, hereinafter described, may be adjusted to lock without perceptible looseness or end play in the assembly. The pivots 26 may be made adjustable by a slotted head and a lock nut, as shown, or by equivalent means.

The hand lever 22, with the shifter yoke and carriage, are retained in their various forward and reverse speed positions by a plunger 27, in the lower part of the lever and carriage. The plunger is operable, to disengage, by a button or the like and a rod, extending through the lever 22. The plunger proper as shown, is a small cylindrical element, the upper part of which is cut away so as to permit this portion to clear the shaft 15. The shaft 15 is provided with notches 28 adapted to receive the lower part of the plunger, to permit interlocking of the carriage and yoke with shaft 15. The notches 28 are, by preference, only long enough to serve this purpose. As shown, they do not come within the paths of the rollers, even when shaft 15 may be slightly rotated to serve the purpose of a brake shaft.

A spring 29 serves to keep the plunger in its upward or operative position and yet permits it to be easily depressed when changing speed positions. The noninterlock and the interlock positions of the plunger will appear in Figs. 1 and 3 respectively, from which it will appear that the plunger is depressed by the button on lever 22, permitting movement of the yoke and carriage to any selected speed position. Upon release of the plunger button, the parts are interlocked and so retained by the spring 29.

All of the described mechanism has been designed for long service with a minimum of wear, with the exception of a wearing surface on the friction wheel 7. This is preferably provided with a replaceable friction facing 30. This may be of some fibrous friction material, such as a tarred fiber facing. As the facing wears in service the wheel may be advanced closer against the disc 5 by adjustment of the lever 11, and by advancing the shaft toward the disc 5 by means of shifting the member 9.

The rotation imparted to the shaft 6 through the transmission device, may in turn be applied to the rear axle of a vehicle by means of a sprocket wheel, or its equivalent 31, and a suitable connecting chain (not shown). Adjustment means of some usual type may be provided in connection with the bearing for the drive axle of the vehicle for taking up slack in the chain, thereby keeping the shaft 6 at approximately the same angle with the disc 5 at all times, irrespective of wear in the chain.

It will be seen that the described means of controlling pressure between the driving and driven friction elements, is novel and simple in form, economical of manufacture, and comprises comparatively few parts; that the arrangement described will enable the use of a friction wheel and friction disc as clutch elements in addition to their function as a speed-change device.

It will be seen that the described or some other embodiment of the invention may be employed on stationary machinery installations, as well as in the propulsion of vehicle.

I claim as my invention:

1. In combination in a frictional speed-change device, a disc, a wheel adapted to rotate at an angle with the disc, a shaft for the wheel, a pair of bearing arms for the shaft, a self-aligning bearing carried by each of the bearing arms, a pivot for one of the arms, means for moving said arm about the pivot, adapted to effect a pressure adjustment between the disc and the wheel, a shifting carriage for the wheel, rollers on said carriage, a guide shaft between certain of the rollers, and means for shifting the carriage independently of said movement to effect pressure adjustment.

2. In a frictional speed-change device, in combination a disc, a wheel adapted to engage the disc at an angle, the disc and wheel being adapted to serve as a clutch, a wheel shaft and a plurality of bearing arms therefor, self-aligning bearings in the bearing-arms, one of the arms being pivoted, a lever connected to, and adapted to effect a restricted rotation of the pivoted bearing-arm and adapted thereby to control the distance between and pressure of engagement of said wheel and said disc; a shifting carriage for said wheel, a guide member for said carriage, and rollers on said carriage, engaging opposite portions of the guide member.

3. In a friction transmission, a driving disc, a driven disc, a shifting device for one of the discs comprising a carriage, a shifter yoke adapted to move with the carriage, a guide shaft for the carriage, rollers on the carriage, arranged to engage opposite sides of the guide shaft, and the carriage and shaft being arranged for a limited relative rotation.

4. In combination with a friction transmission, a shifting device and a guide shaft therefore, having spaced recesses thereon, rollers on the shifting device adapted to engage opposite sides of the shaft, adjustable pivots for the rollers, and a spring pressed plunger associated with the shifting device, adapter to engage the shaft recesses to position the shifting device.

5. In a friction transmission, a driving disc, a friction wheel, a shaft for the wheel, a pivoted bearing arm eccentrically associated with the shaft and adapted by partial rotation to determine the operative engagement of the disc and wheel, a shifting carriage for the friction wheel, rollers on the carriage, a shaft adapted to be engaged by the rollers to carry the carriage and having stop notches thereon, and a spring pressed plunger carried by the carriage, and adapted to engage the stop notches to position the carriage axially on the shaft.

CHARLES GROSS.